United States Patent
Guo et al.

(10) Patent No.: US 12,355,248 B2
(45) Date of Patent: Jul. 8, 2025

(54) WIND TURBINE, AND CONTROL METHOD AND APPARATUS FOR CONVERTER OF WIND TURBINE

(71) Applicant: GOLDWIND SCIENCE & TECHNOLOGY CO., LTD., Urumqi (CN)

(72) Inventors: Rui Guo, Beijing (CN); Yuanyan Huang, Beijing (CN); Chuang Liu, Beijing (CN)

(73) Assignee: GOLDWIND SCIENCE & TECHNOLOGY CO., LTD, Urumqi (CN)

( * ) Notice: Subject to any disclaimer, the term of this patent is extended or adjusted under 35 U.S.C. 154(b) by 0 days.

(21) Appl. No.: 18/685,756

(22) PCT Filed: Mar. 14, 2022

(86) PCT No.: PCT/CN2022/080572
§ 371 (c)(1),
(2) Date: Feb. 22, 2024

(87) PCT Pub. No.: WO2023/108925
PCT Pub. Date: Jun. 22, 2023

(65) Prior Publication Data
US 2025/0132567 A1    Apr. 24, 2025

(30) Foreign Application Priority Data
Dec. 15, 2021  (CN) .......................... 202111535558.6

(51) Int. Cl.
*H02J 3/24* (2006.01)
*F03D 9/25* (2016.01)
(Continued)

(52) U.S. Cl.
CPC .............. *H02J 3/241* (2020.01); *F03D 9/255* (2017.02); *H02J 3/381* (2013.01); *H02J 3/46* (2013.01);
(Continued)

(58) Field of Classification Search
CPC .... H02J 3/241; H02J 3/381; H02J 3/46; H02J 2101/15; H02J 2300/28; F03D 9/255
See application file for complete search history.

(56) References Cited

U.S. PATENT DOCUMENTS

2022/0352726 A1   11/2022  Zhang et al.
2024/0332972 A1*  10/2024  Zhang ....................... H02J 3/38

FOREIGN PATENT DOCUMENTS

CN    106953317 A    7/2017
CN    110994668 A    4/2020
(Continued)

OTHER PUBLICATIONS

International Search Report in related PCT Application No. PCT/CN2022/080572 dated Sep. 2, 2022 (8 pages).
(Continued)

*Primary Examiner* — Sean Gugger
(74) *Attorney, Agent, or Firm* — Bayes PLLC (57) ABSTRACT

A wind turbine generator set, and a control method and apparatus for a wind power converter are provided. The control method includes extracting a super-synchronous oscillation component of a grid-side voltage of a wind power converter and a super-synchronous oscillation component of a grid-side current of the wind power converter. The control method also includes determining a phase angle of equivalent impedance of the wind power converter based on the super-synchronous oscillation component of the grid-side voltage and the super-synchronous oscillation component of the grid-side current. The control method further includes
(Continued)

setting an operation mode of the wind power converter based on the super-synchronous oscillation component of the grid-side voltage and/or the super-synchronous oscillation component of the grid-side current, and the phase angle.

20 Claims, 5 Drawing Sheets

(51) Int. Cl.
  *H02J 3/38* (2006.01)
  *H02J 3/46* (2006.01)
  *H02P 9/44* (2006.01)
  *H02P 101/15* (2016.01)
(52) U.S. Cl.
  CPC ............ *H02P 9/44* (2013.01); *H02J 2300/28* (2020.01); *H02P 2101/15* (2015.01)

(56) References Cited

FOREIGN PATENT DOCUMENTS

| | | |
|---|---|---|
| CN | 111431208 A | 7/2020 |
| CN | 111969620 A | 11/2020 |
| CN | 112886644 A | 6/2021 |
| CN | 113285471 A | 8/2021 |
| JP | 2016226263 A | 12/2016 |
| WO | 2021233190 A1 | 11/2021 |

OTHER PUBLICATIONS

Office Action in related Chinese Application No. 202111535558.6 dated Apr. 23, 2024 (6 pages).
Extended European Search Report in related European Application No. 22905696.5 dated Nov. 8, 2024 (8 pages).

* cited by examiner

Extract a super-synchronous oscillation component of a grid-side voltage and a super-synchronous oscillation component of a grid-side current of a converter of wind turbine — S401

Determine a phase angle of equivalent impedance of the converter of wind turbine based on the super-synchronous oscillation component of the grid-side voltage and the super-synchronous oscillation component of the grid-side current — S402

Set an operation mode of the converter of wind turbine based on the super-synchronous oscillation component of the grid-side voltage and/or the super-synchronous oscillation component of the grid-side current together with the phase angle of the equivalent impedance — S403

WIND TURBINE, AND CONTROL METHOD AND APPARATUS FOR CONVERTER OF WIND TURBINE

CROSS-REFERENCE TO RELATED APPLICATIONS

This application is the national phase of International Application No. PCT/CN2022/080572, filed on Mar. 14, 2022, which claims the priority to Chinese Patent application Ser. No. 20/211,1535558.6, filed on Dec. 15, 2021. The entire contents of each of the above-identified applications are expressly incorporated herein by reference.

TECHNICAL FIELD

The present disclosure relates to the field of wind power generation, and in particular to a method and an apparatus for controlling a converter of wind turbine.

BACKGROUND

A wind turbine generator system is a device for converting wind energy into electric energy. Generally, a direct-driven or semi-direct-driven wind turbine generator system is connected to the power grid using a full-power converter. The full-power converter may be divided into a generator-side converter (rectifier) and a grid-side converter (inverter). The generator-side converter converts an alternating current outputted by the wind turbine generator system into a direct current. The grid-side converter converts the direct current into an alternating current for grid connection. For stable operation of the full-power converter, it is required to control a voltage on a direct-current bus between the generator-side converter and the grid-side converter.

Currently, there is an obvious trend in large scale of the wind turbine generator system. In order to meet the demand of large capacity, most of wind turbine generator systems are implemented in a form of multiple windings. For example, at present, most of large-capacity wind turbine generator systems include two to four windings, and two to four converters of wind turbine connected in parallel are required to match the two to four windings.

The converter of wind turbine for grid connection may be controlled to operate in two modes, namely grid-following mode (also referred to as current-source operation mode) and grid-forming mode (also referred to as voltage-source operation mode). In the grid-following mode, a phase of a grid voltage is tracked using a phase-locking technique by acquiring the grid voltage. Active-power controlling is performed by injecting an active current having a phase the same as the phase of the grid voltage, and reactive-power controlling is performed by injecting a reactive current having a phase with a difference of 90 degrees from the phase of the grid voltage. The grid-forming mode is the same as the grid-connection technology for a synchronous generator. A motion equation of a rotor of the synchronous generator is simulated to synchronize with the power grid based on acceleration and deceleration of the rotor. Active-power controlling is performed by adjusting a phase difference (power angle) between the output voltage of the converter of wind turbine and the grid voltage, and reactive-power controlling is performed by adjusting an amplitude difference between the output voltage of the converter of wind turbine and the grid voltage. Grid-connection characteristics of the grid-forming mode are similar to grid-connection characteristics of the synchronous generator, so that the operation of the power grid can be supported better in the grid-forming mode.

Figure 1:
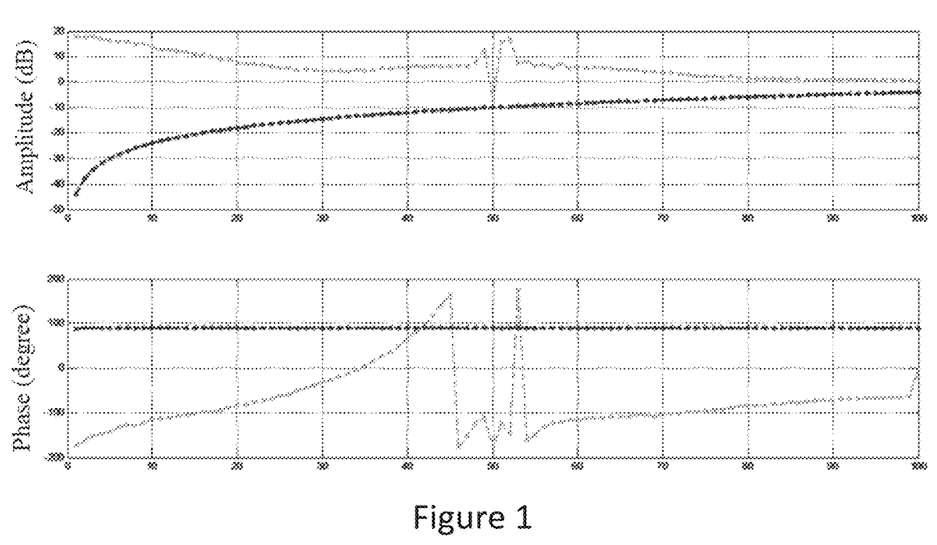
FIG. 1 is a schematic diagram showing output impedance of a converter of wind turbine in a grid-following mode.
Figure 2:
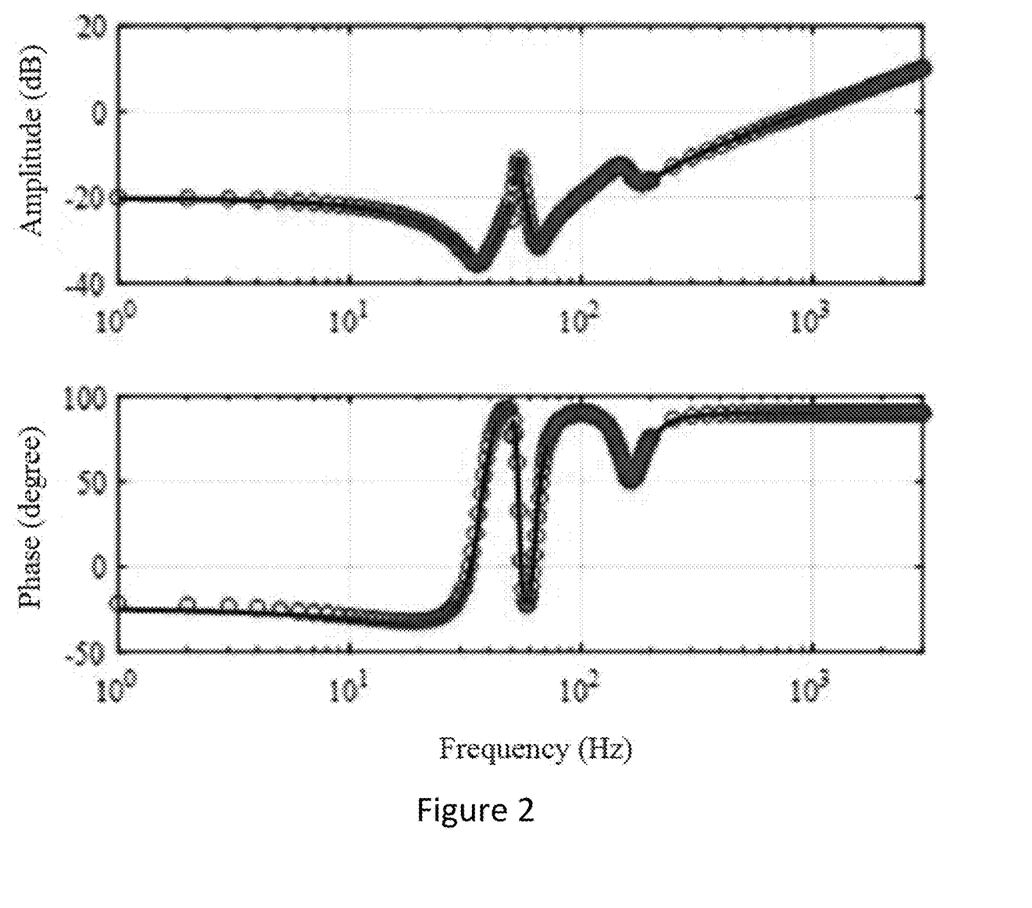
FIG. 2 is a schematic diagram showing output impedance of a converter of wind turbine in a grid-forming mode.

FIG. 1 is a schematic diagram showing output impedance of a converter of wind turbine in the grid-following mode, and FIG. 2 is a schematic diagram showing output impedance of a converter of wind turbine in the grid-forming mode.

As shown in FIG. 1 and FIG. 2, the output impedance of the converter of wind turbine in the grid-following mode is capacitive within a super-synchronous frequency band (from 50 Hz to 100 Hz), and the converter of wind turbine is prone to vibrate in resonance with a transmission line (inductive) of the power grid. The output impedance of the converter of wind turbine in the grid-forming mode is inductive within the super-synchronous frequency band (from 50 Hz to 100 Hz), and the converter of wind turbine is prone to vibrate in resonance with a power grid provided with series compensation (i.e., a series compensation device). In the power grid provided with series compensation, a manner in which the power grid operates is variable in real time. The transmission line is inductive in a case that a series compensation capacitor on the transmission line is not put into use, and the transmission line is capacitive in a case that the series compensation capacitor on the transmission line is put into use. Therefore, there is a risk of resonance between the grid-side converter and the power grid if the converter of wind turbine is not adjusted based on the impedance characteristics of the external transmission line.

SUMMARY

An objective of the embodiments of the present disclosure is to provide a method and an apparatus for controlling a converter of wind turbine, to cause the converter of wind turbine to switch between a voltage-source operation mode and a current-source operation mode, so as to solve the problem of oscillation of the operation of the power grid when a series compensation capacitor is put into operation and removed from operation.

In an aspect, a method for controlling a converter of wind turbine is provided. The method includes: extracting a super-synchronous oscillation component of a grid-side voltage and a super-synchronous oscillation component of a grid-side current of the converter of wind turbine; determining a phase angle of equivalent impedance of the converter of wind turbine based on the super-synchronous oscillation component of the grid-side voltage and the super-synchronous oscillation component of the grid-side current; and setting an operation mode of the converter of wind turbine to a current-source operation mode or a voltage-source operation mode based on the super-synchronous oscillation component of the grid-side voltage and/or the super-synchronous oscillation component of the grid-side current, and the phase angle.

In another aspect, an apparatus for controlling a converter of wind turbine is provided. The apparatus includes a voltage-current extraction unit, a phase-angle determination unit, and an operation-mode setting unit. The voltage-current extraction unit is configured to extract a super-synchronous oscillation component of a grid-side voltage and a super-synchronous oscillation component of a grid-side current of the converter of wind turbine. The phase-angle determination unit is configured to determine a phase angle of equivalent impedance of the converter of wind turbine based on the super-synchronous oscillation component of the grid-side voltage and the super-synchronous oscillation component of the grid-side current. The operation-mode setting unit is configured to set an operation mode of the converter of wind turbine to a current-source operation mode or a voltage-source operation mode based on the super-synchronous oscillation component of the grid-side voltage and/or the super-synchronous oscillation component of the grid-side current, and the phase angle.

In another aspect, a computer-readable storage medium storing a computer program is provided. The method for controlling a converter of wind turbine described above is implemented when the computer program is executed by a processor.

In another aspect, a controller is provided. The controller includes a processor and a memory storing a computer program. The method for controlling a converter of wind turbine described above is implemented when the computer program is executed by the processor.

In another aspect, a converter of wind turbine is provided. The converter of wind turbine includes the apparatus for controlling a converter of wind turbine described above or the controller described above.

In another aspect, a wind turbine is provided. The wind turbine includes the converter of wind turbine described above.

With the method and the apparatus for controlling a converter of wind turbine according to the embodiments of the present disclosure, the converter of wind turbine is controlled to switch between the voltage-source operation mode and the current-source operation mode based on the super-synchronous oscillation characteristics of the power grid, which reduces the resonance between the converter of wind turbine and the power grid, thereby enabling the converter of wind turbine to operate stably in the power grid provided with series compensation.

BRIEF DESCRIPTION OF DRAWINGS

The above and other objects and features of the present disclosure will become clearer through the following description in conjunction with the drawings.

DETAILED DESCRIPTION

The following embodiments are provided to help readers to obtain a comprehensive understanding of the method, apparatus, and/or system described here. However, after understanding the present disclosure, various variations, modifications, and equivalents of the method, apparatus, and/or system described herein will be clear. For example, an order of operations described herein is only exemplary but not restrictive, and may be changed as what would be clear after understanding the present disclosure, except for operations that are required to occur in a specific order. In addition, description of features known in the art may be omitted, for clarity and conciseness.

The features described herein may be implemented in different forms and should not be limited to the examples described here. On the contrary, the examples described here are provided to illustrate only some of feasible ways of implementing the method, apparatus, and/or system described here, many other feasible ways would be clear after understanding the present disclosure.

As used herein, terms "and/or" includes any one of listed items, and any combination of any two or more of the items.

Although terms "first," "second," "third" and the like may be used herein to describe various components, elements, regions, layers, or parts, these components, elements, regions, layers, or parts should not be limited by these terms. On the contrary, these terms are only used to distinguish one component, element, region, layer, or part from another component, component, region, layer, or part. Therefore, without departing from the teachings of the examples, a first component, first element, first region, first layer, or first part referred to in the examples described herein may also be referred to as a second component, second element, second region, second layer, or second part.

In the specification, when a component (such as a layer, region, or substrate) is described as being "on", "connected to", or "bonded to" another component, the component may be directly "on", "connected to", or "bonded to" another component, or there may be one or more other components between the two components. On the contrary, when a component is described as "directly on" another component, "directly connected to" or "directly bonded to" another component, there may be no other components between the two components.

The terms used herein are only for describing various examples and are not intended to limit the present disclosure. Unless expressively indicated in the context otherwise, a singular form is also intended to include a plural form. Terms "include", "comprise", and "have" indicate existence of a mentioned feature, quantity, operation, component, element, and/or combination thereof, but do not exclude existence or addition of one or more other features, quantities, operations, components, elements, and/or combinations thereof.

Unless otherwise defined, all terms used herein (including technical terms and scientific terms) have the same meanings as those commonly understood by those skilled in the art to which the present disclosure pertains after understanding the present disclosure. Unless explicitly defined otherwise, terms (such as terms defined in a general dictionary) should be interpreted as having meanings consistent with their respective contexts in the relevant field and in the present disclosure, and should not be interpreted ideally or too formally.

In addition, in the description of the examples, detail description of well-known relevant structures or functions are omitted, when it is believed that the detailed description may result in ambiguity of the present disclosure.

In the present disclosure, the converter of wind turbine is controlled to switch between a voltage-source operation mode and a current-source operation mode, combining characteristics of a grid-forming mode and a grid-following mode, so as to solve the problem of oscillation of the operation of a power grid when a series compensation capacitor is put into operation and removed from operation.

Figure 3:
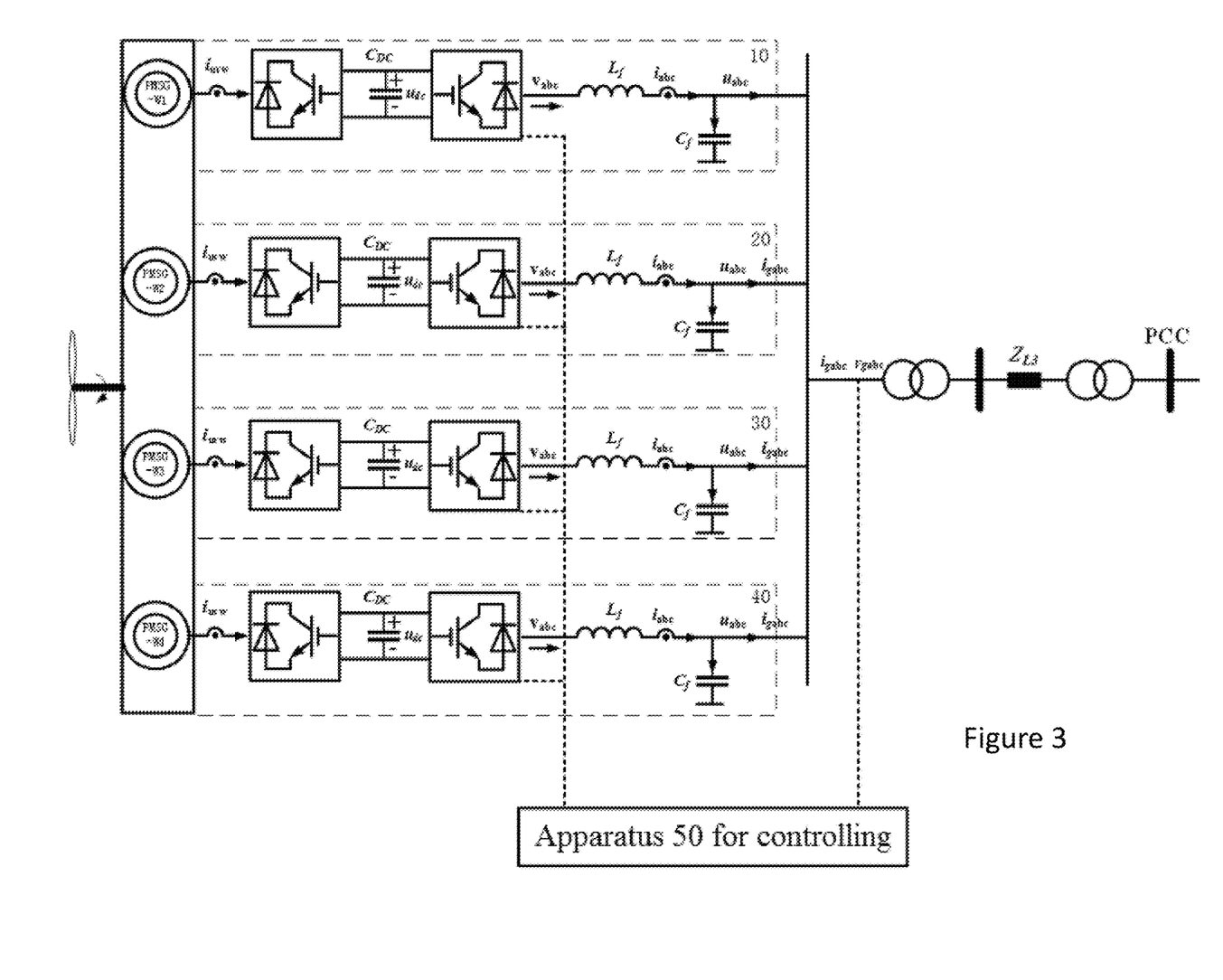
FIG. 3 is a schematic diagram showing an example of a converter of wind turbine according to an embodiment of the present disclosure.

FIG. 3 is a schematic diagram showing an example of a converter of wind turbine according to an embodiment of the present disclosure.

Referring to FIG. 3, the generator of wind turbine includes four windings. The four windings are connected to four full-power converters respectively (i.e., converters of wind turbine 10, 20, 30, and 40). Grid sides of the four converters of wind turbine are converged and then are connected to a power grid via a step-up transformer. An apparatus 50 for controlling a converter of wind turbine acquires a grid-side voltage $v_{gabc}$ and a grid-side current $i_{gabc}$ in real time, extracts a super-synchronous oscillation component of the grid-side voltage and a super-synchronous oscillation component of the grid-side current, and sets an operation mode of the converter of wind turbine based on the super-synchronous oscillation component of the grid-side voltage and the super-synchronous oscillation component of the grid-side current. FIG. 3 shows four converters of wind turbine 10, 20, 30 and 40, but the present disclosure is not limited thereto. The number of the converters of wind turbine may be greater than or equal to two, and depends on the number of windings included in the generator of the wind turbine.

In FIG. 3, for each of the windings included in the generator of the wind turbine, an output current $i_{uvw}$ of the winding is subjected to rectification and inversion processing, to obtain an output voltage $v_{abc}$ of a grid-side inverter; a grid-side filter-inductor current $i_{abc}$ is obtained after passing through a filter inductor $L_f$; a grid-connection voltage $u_{abc}$ is obtained after passing through a grid-side filter capacitor $C_f$. The grid-side filter-inductor currents $i_{abc}$ of the respective converters are converged and the grid-connection voltages $u_{abc}$ of the respective converters are converged to obtain the grid-side voltage $v_{gabc}$ and the grid-side current $i_{gabc}$, which are connected to the power grid after passing through the step-up transformer and the grid-connection transformer.

A method and an apparatus for controlling a converter of wind turbine according to the embodiments of the present disclosure are described in detail below in conjunction with the drawings.

Figure 4:
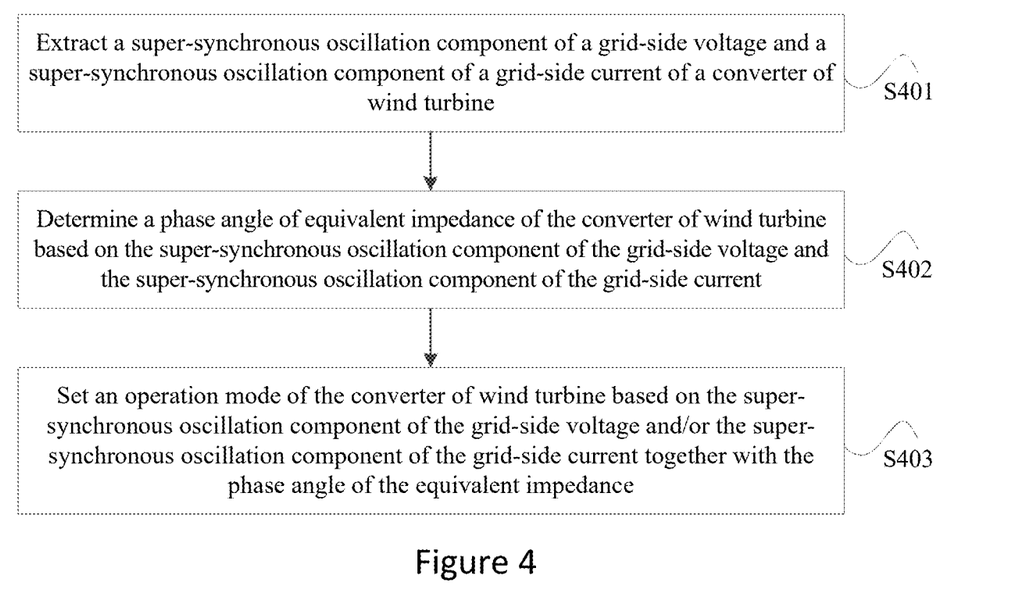
FIG. 4 is a flowchart of a method for controlling a converter of wind turbine according to an embodiment of the present disclosure.

FIG. 4 is a flowchart of a method for controlling a converter of wind turbine according to an embodiment of the present disclosure.

Referring to FIG. 4, in step S401, a super-synchronous oscillation component of a grid-side voltage and a super-synchronous oscillation component of a grid-side current of the converter of wind turbine are extracted. Specifically, the grid-side voltage $v_{gabc}$ and the grid-side current $i_{gabc}$ of the converter of wind turbine may be acquired first, and then FFT analysis is performed on the grid-side voltage $v_{gabc}$ and the grid-side current $i_{gabc}$ in real time, to extract the super-synchronous oscillation components within a frequency band from 50 Hz to 100 Hz.

Next, in step S402, a phase angle of equivalent impedance of the converter of wind turbine is determined based on the super-synchronous oscillation component of the grid-side voltage and the super-synchronous oscillation component of the grid-side current. Specifically, a positive sequence component of the super-synchronous oscillation component of the grid-side voltage and a positive sequence component of the super-synchronous oscillation component of the grid-side current may be extracted, and a phase angle of positive sequence equivalent impedance is determined based on the positive sequence component of the super-synchronous oscillation component of the grid-side voltage and the positive sequence component of the super-synchronous oscillation component of the grid-side current, as the phase angle of the equivalent impedance of the converter of wind turbine.

Subsequently, in step S403, an operation mode of the converter of wind turbine is set based on the super-synchronous oscillation component of the grid-side voltage and/or the super-synchronous oscillation component of the grid-side current together with the phase angle of the equivalent impedance. Specifically, in step S403, it may be first determined whether the super-synchronous oscillation component of the grid-side voltage and/or the super-synchronous oscillation component of the grid-side current are greater than a first preset threshold and a second preset threshold respectively (that is, whether the super-synchronous oscillation component of the grid-side voltage is greater than the first preset threshold and/or whether the super-synchronous oscillation component of the grid-side current is greater than the second preset threshold). Then, the operation mode of the converter of wind turbine is set based on the phase angle of the equivalent impedance in response to the super-synchronous oscillation component of the grid-side voltage and/or the super-synchronous oscillation component of the grid-side current being greater than the first preset threshold and the second preset threshold respectively (that is, the super-synchronous oscillation component of the grid-side voltage being greater than the first preset threshold and/or the super-synchronous oscillation component of the grid-side current being greater than the second preset threshold). Further, it is determined whether the phase angle of the equivalent impedance is greater than zero. The operation mode of the converter of wind turbine may be set to the current-source operation mode in response to the phase angle of the equivalent impedance being greater than zero, and the operation mode of the converter of wind turbine may be set to the voltage-source operation mode in response to the phase angle of the equivalent impedance being less than zero. Here, the phase angle of the equivalent impedance being greater than zero indicates that the equivalent impedance is inductive together with the phase angle of the equivalent impedance being less than zero indicates that the equivalent impedance is capacitive. Therefore, different operation modes may be set for the converter of wind turbine based on the phase angle of the equivalent impedance, to reduce the resonance between the converter of wind turbine and the power grid provided with series compensation. In addition, the preset thresholds are used to determine degrees of the super-synchronous oscillations, which may be set by those skilled in the art as needed and are not limited in the present disclosure.

In addition, the operation mode of the converter of wind turbine may remain unchanged in response to the super-synchronous oscillation component of the grid-side voltage and/or the super-synchronous oscillation component of the grid-side current being less than or equal to the first preset threshold and the second preset threshold respectively (that is, the super-synchronous oscillation component of the grid-side voltage being less than or equal to the first preset threshold and/or the super-synchronous oscillation component of the grid-side current being less than or equal to the second preset threshold).

As described above, there may be multiple converters of wind turbine, for example, N converters. Respective generator-side rectifiers in a first converter to an N-th converter are connected to different windings of the generator of the wind turbine respectively, and respective grid-side inverters in the first converter to the N-th converter are connected to each other. N represents the number of the windings included in the generator of the wind turbine, and N is greater than or equal to 2. In this case, steps S401, S402, and S403 may be performed sequentially for each of the first converter to the N-th converter. That is, the method for controlling a converter of wind turbine as described above is performed for each of the first converter to the N-th converter separately. In other words, after steps of extracting a super-synchronous oscillation component of a grid-side voltage and a super-synchronous oscillation component of a grid-side current, determining a phase angle of an equivalent impedance, and setting an operation mode are performed for the first converter, the steps of extracting a super-synchronous oscillation component of a grid-side voltage and a super-synchronous oscillation component of a grid-side current, determining a phase angle of an equivalent impedance, and setting an operation mode are performed for the second converter of wind turbine. The steps are repeatedly performed, until the steps of extracting a super-synchronous oscillation component of a grid-side voltage and a super-synchronous oscillation component of a grid-side current, determining a phase angle of equivalent impedance, and setting an operation mode are performed for the N-th converter of wind turbine. Therefore, for each of the first converter to the N-th converter, the operation mode of the converter of wind turbine may be switched or remain unchanged.

With the method for controlling a converter of wind turbine according to the embodiments of the present disclosure, the converter of wind turbine is controlled to switch between the voltage-source operation mode and the current-source operation mode based on the super-synchronous oscillation characteristics of the power grid, which reduces the resonance between the converter of wind turbine and the power grid, thereby enabling the converter of wind turbine to operate stably in the power grid provided with series compensation.

Figure 5:
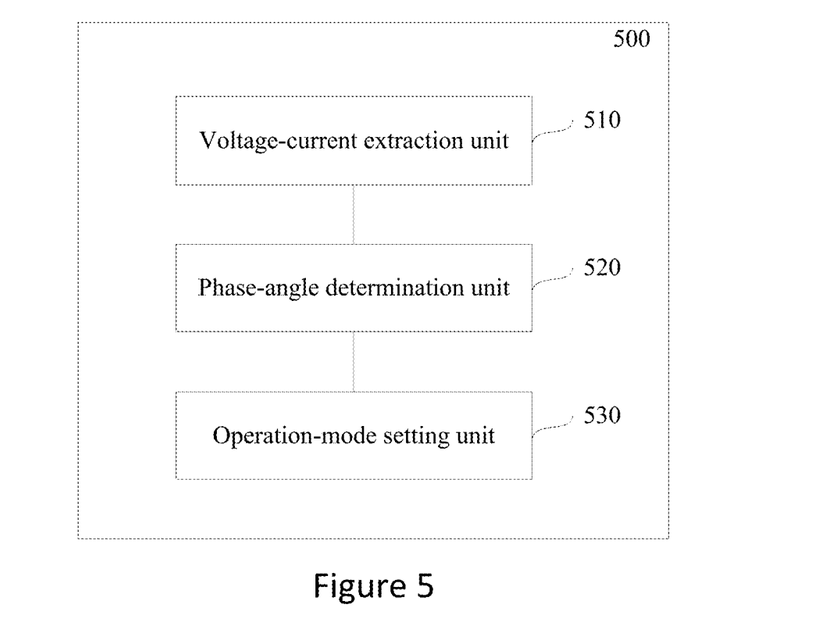
FIG. 5 is a block diagram of an apparatus for controlling a converter of wind turbine according to an embodiment of the present disclosure.

FIG. 5 is a block diagram of an apparatus for controlling a converter of wind turbine according to an embodiment of the present disclosure.

Referring to FIG. 5, the apparatus 500 for controlling a converter of wind turbine includes a voltage-current extraction unit 510, a phase-angle determination unit 520, and an operation-mode setting unit 530. The voltage-current extraction unit 510 is configured to extract a super-synchronous oscillation component of a grid-side voltage and a super-synchronous oscillation component of a grid-side current of the converter of wind turbine. The phase-angle determination unit 520 is configured to determine a phase angle of equivalent impedance of the converter of wind turbine based on the super-synchronous oscillation component of the grid-side voltage and the super-synchronous oscillation component of the grid-side current. The operation-mode setting unit 530 is configured to set an operation mode of the converter of wind turbine to a current-source operation mode or a voltage-source operation mode based on the super-synchronous oscillation component of the grid-side voltage and/or the super-synchronous oscillation component of the grid-side current together with the phase angle of the equivalent impedance.

Specifically, the phase-angle determination unit 520 may be configured to exact a positive sequence component of the super-synchronous oscillation component of the grid-side voltage and a positive sequence component of the super-synchronous oscillation component of the grid-side current, and determine a phase angle of positive sequence equivalent impedance based on the positive sequence component of the super-synchronous oscillation component of the grid-side voltage and the positive sequence component of the super-synchronous oscillation component of the grid-side current, as the phase angle of the equivalent impedance of the converter of wind turbine.

The operation-mode setting unit 530 may be configured to determine whether the super-synchronous oscillation component of the grid-side voltage and/or the super-synchronous oscillation component of the grid-side current are greater than a first preset threshold and a second preset threshold respectively, and set the operation mode of the converter of wind turbine based on the phase angle of the equivalent impedance in response to the super-synchronous oscillation component of the grid-side voltage and/or the super-synchronous oscillation component of the grid-side current being greater than the first preset threshold and the second preset threshold respectively. Further, the operation-mode setting unit 530 may be configured to determine whether the phase angle of the equivalent impedance is greater than zero. The operation-mode setting unit 530 may set the operation mode of the converter of wind turbine to the current-source operation mode in response to the phase angle of the equivalent impedance being greater than zero. The operation-mode setting unit 530 may set the operation mode of the converter of wind turbine to the voltage-source operation mode in response to the phase angle of the equivalent impedance being less than zero. In an embodiment, the operation-mode setting unit 530 may set the operation mode of the converter of wind turbine to remain unchanged in response to the super-synchronous oscillation component of the grid-side voltage and/or the super-synchronous oscillation component of the grid-side current being less than or equal to the first preset threshold and the second preset threshold respectively.

As described above, the converter of wind turbine may include the first converter to the N-th converter. Respective generator-side rectifiers in the first converter to the N-th converter are connected to different windings of the generator of wind turbine respectively, and respective grid-side inverters in the first converter to the N-th converter are connected to each other. N represents the number of the windings included in the generator of wind turbine, and N is greater than or equal to 2. In this case, for each of the first converter to the N-th converter, the voltage-current extraction unit 510 extracts a super-synchronous oscillation component of a grid-side voltage and a super-synchronous oscillation component of a grid-side current, the phase-angle determination unit 520 determines a phase angle of equivalent impedance, and the operation-mode setting unit 530 sets an operation mode of the converter of wind turbine.

Figure 6:
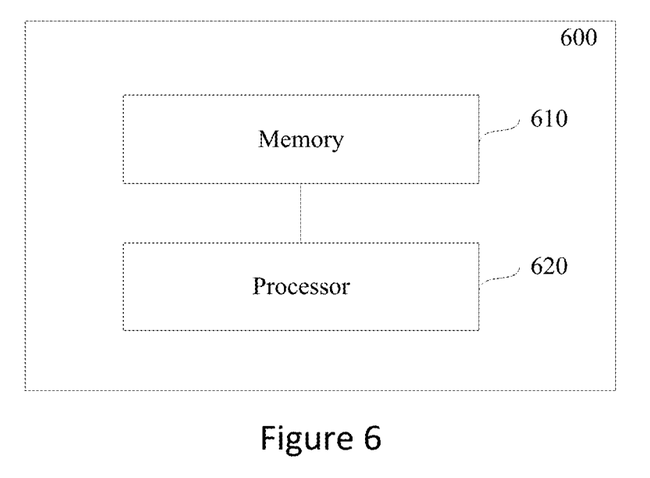
FIG. 6 is a block diagram showing a controller according to an embodiment of the present disclosure.

FIG. 6 is a block diagram showing a controller according to an embodiment of the present disclosure. The controller may be implemented as a controller for a converter of wind turbine, or other controller such as a main controller or a dedicated controller in a wind turbine.

Referring to FIG. 6, the controller 600 according to an embodiment of the present disclosure may include a processor 610 and a memory 620. The processor 610 may include (but is not limited to) a central processing unit (CPU), a digital signal processor (DSP), a microcomputer, a field programmable gate array (FPGA), a system on chip (SOC), a microprocessor, an application specific integrated circuit (ASIC), and the like. The memory 620 stores a computer program executable by the processor 610. The memory 620 includes a high-speed random access memory and/or a non-volatile computer-readable storage medium. When the processor 610 executes the computer program stored in the memory 620, the method for controlling a converter of wind turbine described above is implemented.

In an embodiment, the controller 600 may communicate with various components in the wind turbine in a wired/wireless communication mode, and may further communicate with a device outside the wind turbine and/or a wind power plant in a wired/wireless communication mode.

The method for controlling a converter of wind turbine according to the embodiments of the present disclosure may be programmed as a computer program stored on a computer-readable storage medium. When the computer program is executed by a processor, the method for controlling a converter of wind turbine as described above is implemented. Examples of the computer-readable storage medium include: a read-only memory (ROM), a random access programmable read-only memory (PROM), an electrically erasable programmable read-only memory (EEPROM), a random access memory (RAM), a dynamic random access memory (DRAM), a static random access memory (SRAM), a flash memory, a non-volatile memory, a CD-ROM, a CD-R, a CD+R, a CD-RW, a CD+RW, a DVD-ROM, a DVD-R, a DVD+R, a DVD-RW, a DVD+RW, a DVD-RAM, a BD-ROM, a BD-R, a BD-R LTH, a BD-RE, a Blu-ray or optical disk memory, a hard disk drive (HDD), a solid state disk (SSD), a card type memory (such as a multimedia card, a secure digital (SD) card or an extreme digital (XD) card), a magnetic tape, a floppy disk, a magneto-optical data storage device, an optical data storage device, a hard disk, a solid state disk and any other device. The any other device is configured to store a computer program and any associated data, data files, and data structures in a non-transient manner and provide the computer program and any associated data, the data files, and the data structures to a processor or a computer to cause the processor or the computer to execute the computer program. In an example, the computer program and any associated data, the data files, and the data structures are distributed on a networked computer system, so that the computer program and any associated data, the data files, and the data structures are stored, accessed, and executed in a distributed manner through one or more processors or computers.

With the method and the apparatus for controlling a converter of wind turbine according to the embodiments of the present disclosure, the converter of wind turbine is controlled to switch between the voltage-source operation mode and the current-source operation mode based on the super-synchronous oscillation characteristics of the power grid, which reduces the resonance between the converter of wind turbine and the power grid, thereby enabling the converter of wind turbine to operate stably in the power grid provided with series compensation.

Although some embodiments of the present disclosure have been illustrated and described, those skilled in the art should understand that modifications can be made to these embodiments without departing from the principles and spirit of the present disclosure, which are defined by the claims and equivalents thereof.

The invention claimed is:

1. A method for controlling a converter of a wind turbine, comprising:
   extracting a super-synchronous oscillation component of a grid-side voltage and a super-synchronous oscillation component of a grid-side current of the converter of the wind turbine;
   determining a phase angle of equivalent impedance of the converter of the wind turbine based on the super-synchronous oscillation component of the grid-side voltage and the super-synchronous oscillation component of the grid-side current; and
   setting an operation mode of the converter of the wind turbine to a current-source operation mode or a voltage-source operation mode based on at least one of the super-synchronous oscillation component of the grid-side voltage or the super-synchronous oscillation component of the grid-side current together with the phase angle.

2. The method according to claim 1, wherein setting the operation mode of the converter of the wind turbine comprises:
   determining at least one of whether the super-synchronous oscillation component of the grid-side voltage is greater than a first preset threshold or whether the super-synchronous oscillation component of the grid-side current is greater than a second preset threshold, and
   setting the operation mode of the converter of the wind turbine based on the phase angle in response to at least one of the super-synchronous oscillation component of the grid-side voltage being greater than the first preset threshold or the super-synchronous oscillation component of the grid-side current being greater than the second preset threshold.

3. The method according to claim 2, wherein setting the operation mode of the converter of the wind turbine based on the phase angle comprises:
   determining whether the phase angle is greater than zero;
   setting the operation mode of the converter of the wind turbine to the current-source operation mode in response to the phase angle being greater than zero; or
   setting the operation mode of the converter of the wind turbine to the voltage-source operation mode in response to the phase angle being less than zero.

4. The method according to claim 2, wherein setting the operation mode of the converter of the wind turbine further comprises:
   setting the operation mode of the converter of the wind turbine to remain unchanged in response to at least one of the super-synchronous oscillation component of the grid-side voltage being less than or equal to the first preset threshold or the super-synchronous oscillation component of the grid-side current being less than or equal to the second preset threshold.

5. The method according to claim 2, wherein determining the phase angle of equivalent impedance of the converter of the wind turbine comprises:
   extracting a positive sequence component of the super-synchronous oscillation component of the grid-side voltage and a positive sequence component of the super-synchronous oscillation component of the grid-side current, and determining a phase angle of positive sequence equivalent impedance based on the positive sequence component of the super-synchronous oscillation component of the grid-side voltage and the positive sequence component of the super-synchronous oscillation component of the grid-side current, as the phase angle of the equivalent impedance of the converter of the wind turbine.

6. The method according to claim 1, wherein the converter of the wind turbine comprises a first converter to an N-th converter, respective generator-side rectifiers in the first converter to the N-th converter are connected to different windings of a generator of the wind turbine respectively, and respective grid-side inverters in the first converter to the N-th converter are connected to each other,
wherein N represents the number of the windings comprised in the generator of the wind turbine, and N is greater than or equal to 2; and
wherein the method for controlling the converter of the wind turbine is performed separately for each of the first converter to the N-th converter.

7. A non-transitory computer-readable storage medium storing a computer program, wherein a method for controlling a converter of a wind turbine is implemented when the computer program is executed by a processor, and the method comprises:
extracting a super-synchronous oscillation component of a grid-side voltage and a super-synchronous oscillation component of a grid-side current of the converter of the wind turbine;
determining a phase angle of equivalent impedance of the converter of the wind turbine based on the super-synchronous oscillation component of the grid-side voltage and the super-synchronous oscillation component of the grid-side current; and
setting an operation mode of the converter of the wind turbine to a current-source operation mode or a voltage-source operation mode based on at least one of the super-synchronous oscillation component of the grid-side voltage or the super-synchronous oscillation component of the grid-side current together with the phase angle.

8. A controller, comprising:
a processor; and
a memory storing a computer program, wherein when the computer program is executed by the processor, the processor is configured to implement operations comprising:
extracting a super-synchronous oscillation component of a grid-side voltage and a super-synchronous oscillation component of a grid-side current of a converter of a wind turbine;
determining a phase angle of equivalent impedance of the converter of the wind turbine based on the super-synchronous oscillation component of the grid-side voltage and the super-synchronous oscillation component of the grid-side current; and
setting an operation mode of the converter of the wind turbine to a current-source operation mode or a voltage-source operation mode based on at least one of the super-synchronous oscillation component of the grid-side voltage or the super-synchronous oscillation component of the grid-side current together with the phase angle.

9. A converter of a wind turbine, comprising:
a controller, comprising:
a processor; and
a memory storing a computer program, wherein when the computer program is executed by the processor, the processor is configured to implement operations comprising:
extracting a super-synchronous oscillation component of a grid-side voltage and a super-synchronous oscillation component of a grid-side current of the converter of the wind turbine;
determining a phase angle of equivalent impedance of the converter of the wind turbine based on the super-synchronous oscillation component of the grid-side voltage and the super-synchronous oscillation component of the grid-side current; and
setting an operation mode of the converter of the wind turbine to a current-source operation mode or a voltage-source operation mode based on at least one of the super-synchronous oscillation component of the grid-side voltage or the super-synchronous oscillation component of the grid-side current together with the phase angle.

10. A wind turbine, comprising:
a converter, comprising:
a controller, comprising:
a processor; and
a memory storing a computer program, wherein when the computer program is executed by the processor, the processor is configured to implement operations comprising:
extracting a super-synchronous oscillation component of a grid-side voltage and a super-synchronous oscillation component of a grid-side current of the converter of the wind turbine;
determining a phase angle of equivalent impedance of the converter of the wind turbine based on the super-synchronous oscillation component of the grid-side voltage and the super-synchronous oscillation component of the grid-side current; and
setting an operation mode of the converter of the wind turbine to a current-source operation mode or a voltage-source operation mode based on at least one of the super-synchronous oscillation component of the grid-side voltage or the super-synchronous oscillation component of the grid-side current together with the phase angle.

11. The wind turbine according to claim 10, wherein the wind turbine further comprises a generator, wherein the generator of the wind turbine comprises N converters, respective generator-side rectifiers in the N converters are connected to different windings of the generator of the wind turbine respectively, and respective grid-side inverters in the N converters are connected to each other, wherein N represents the number of the windings comprised in the generator, and N is greater than or equal to 2.

12. The controller according to claim 8, wherein the operations further comprise:
determining at least one of whether the super-synchronous oscillation component of the grid-side voltage is greater than a first preset threshold or whether the super-synchronous oscillation component of the grid-side current is greater than a second preset threshold; and
setting the operation mode of the converter of the wind turbine based on the phase angle in response to at least one of the super-synchronous oscillation component of the grid-side voltage being greater than the first preset threshold or the super-synchronous oscillation component of the grid-side current being greater than the second preset threshold.

13. The controller according to claim 12, wherein the operations further comprise:
determining whether the phase angle is greater than zero;
setting the operation mode of the converter of the wind turbine to the current-source operation mode in response to the phase angle being greater than zero; or
setting the operation mode of the converter of the wind turbine to the voltage-source operation mode in response to the phase angle being less than zero.

14. The controller according to claim 12, wherein the operations further comprise:
setting the operation mode of the converter of the wind turbine to remain unchanged in response to at least one of the super-synchronous oscillation component of the grid-side voltage being less than or equal to the first preset threshold or the super-synchronous oscillation component of the grid-side current being less than or equal to the second preset threshold.

15. The controller according to claim 12, wherein the operations further comprise:
extracting a positive sequence component of the super-synchronous oscillation component of the grid-side voltage and a positive sequence component of the super-synchronous oscillation component of the grid-side current, and determining a phase angle of positive sequence equivalent impedance based on the positive sequence component of the super-synchronous oscillation component of the grid-side voltage and the positive sequence component of the super-synchronous oscillation component of the grid-side current, as the phase angle of the equivalent impedance of the converter of the wind turbine.

16. The computer-readable storage medium according to claim 7, wherein setting the operation mode of the converter of the wind turbine comprises:
determining at least one of whether the super-synchronous oscillation component of the grid-side voltage is greater than a first preset threshold or whether the super-synchronous oscillation component of the grid-side current is greater than a second preset threshold; and
setting the operation mode of the converter of the wind turbine based on the phase angle in response to at least one of the super-synchronous oscillation component of the grid-side voltage being greater than the first preset threshold or the super-synchronous oscillation component of the grid-side current being greater than the second preset threshold.

17. The computer-readable storage medium according to claim 16, wherein setting the operation mode of the converter of the wind turbine based on the phase angle comprises:
determining whether the phase angle is greater than zero; setting the operation mode of the converter of the wind turbine to the current-source operation mode in response to the phase angle being greater than zero; or
setting the operation mode of the converter of the wind turbine to the voltage-source operation mode in response to the phase angle being less than zero.

18. The computer-readable storage medium according to claim 16, wherein setting the operation mode of the converter of the wind turbine further comprises:
setting the operation mode of the converter of the wind turbine to remain unchanged in response to at least one of the super-synchronous oscillation component of the grid-side voltage being less than or equal to the first preset threshold or the super-synchronous oscillation component of the grid-side current being less than or equal to the second preset threshold.

19. The computer-readable storage medium according to claim 16, wherein determining the phase angle of equivalent impedance of the converter of the wind turbine comprises:
extracting a positive sequence component of the super-synchronous oscillation component of the grid-side voltage and a positive sequence component of the super-synchronous oscillation component of the grid-side current, and determining a phase angle of positive sequence equivalent impedance based on the positive sequence component of the super-synchronous oscillation component of the grid-side voltage and the positive sequence component of the super-synchronous oscillation component of the grid-side current, as the phase angle of the equivalent impedance of the converter of the wind turbine.

20. The computer-readable storage medium according to claim 7, wherein the converter of the wind turbine comprises a first converter to an N-th converter, respective generator-side rectifiers in the first converter to the N-th converter are connected to different windings of a generator of the wind turbine respectively, and respective grid-side inverters in the first converter to the N-th converter are connected to each other,
wherein N represents the number of the windings comprised in the generator of the wind turbine, and N is greater than or equal to 2; and
wherein the method for controlling the converter of the wind turbine is performed separately for each of the first converter to the N-th converter.

* * * * *